Aug. 31, 1965  G. VP. TOTTEN  3,203,340
BEVERAGE BREWING AND DISPENSING MECHANISM
Filed Feb. 1, 1963  3 Sheets-Sheet 1
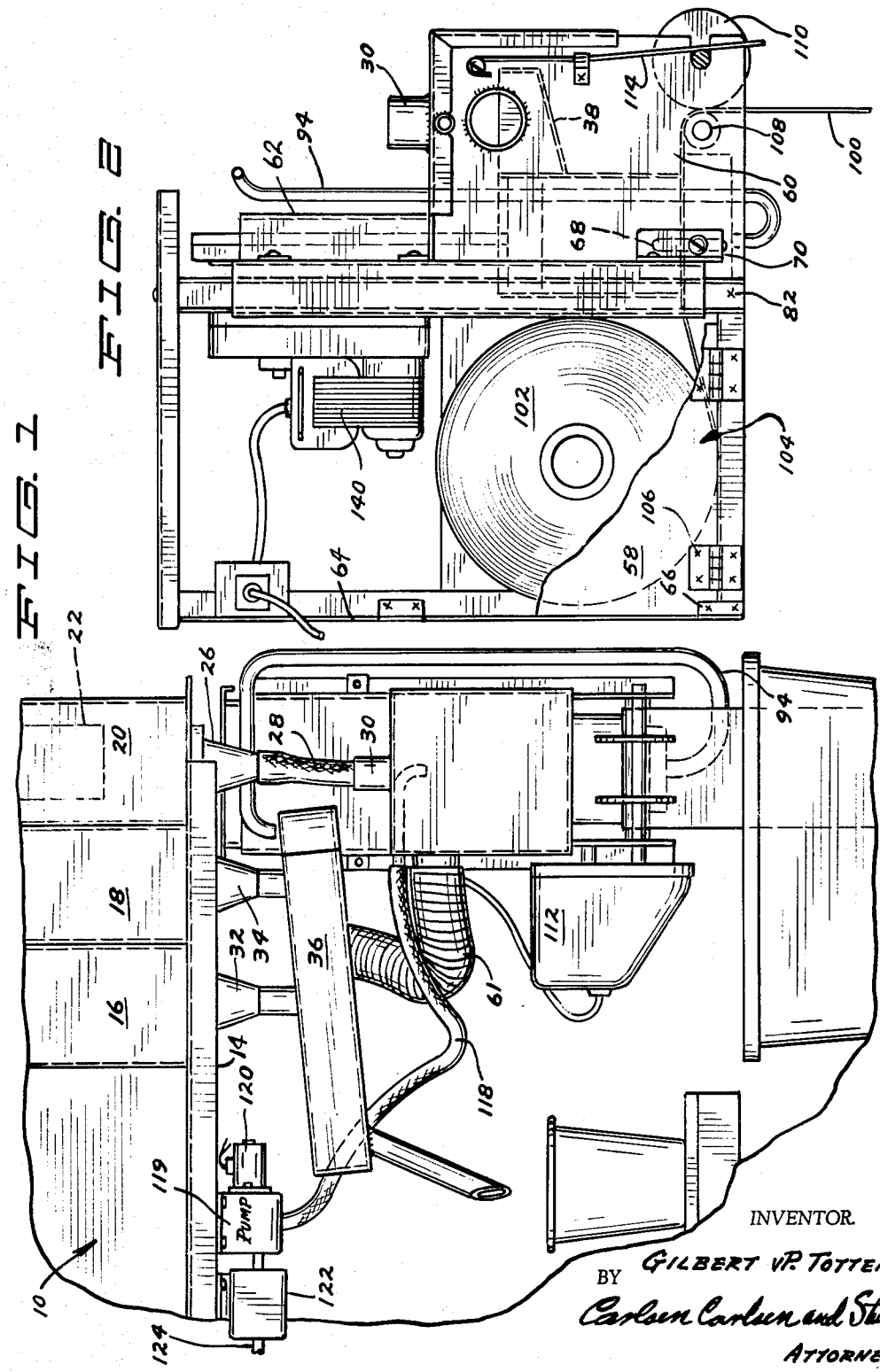
INVENTOR.
GILBERT VP. TOTTEN
BY
Carlsen Carlsen and Sturm
ATTORNEYS

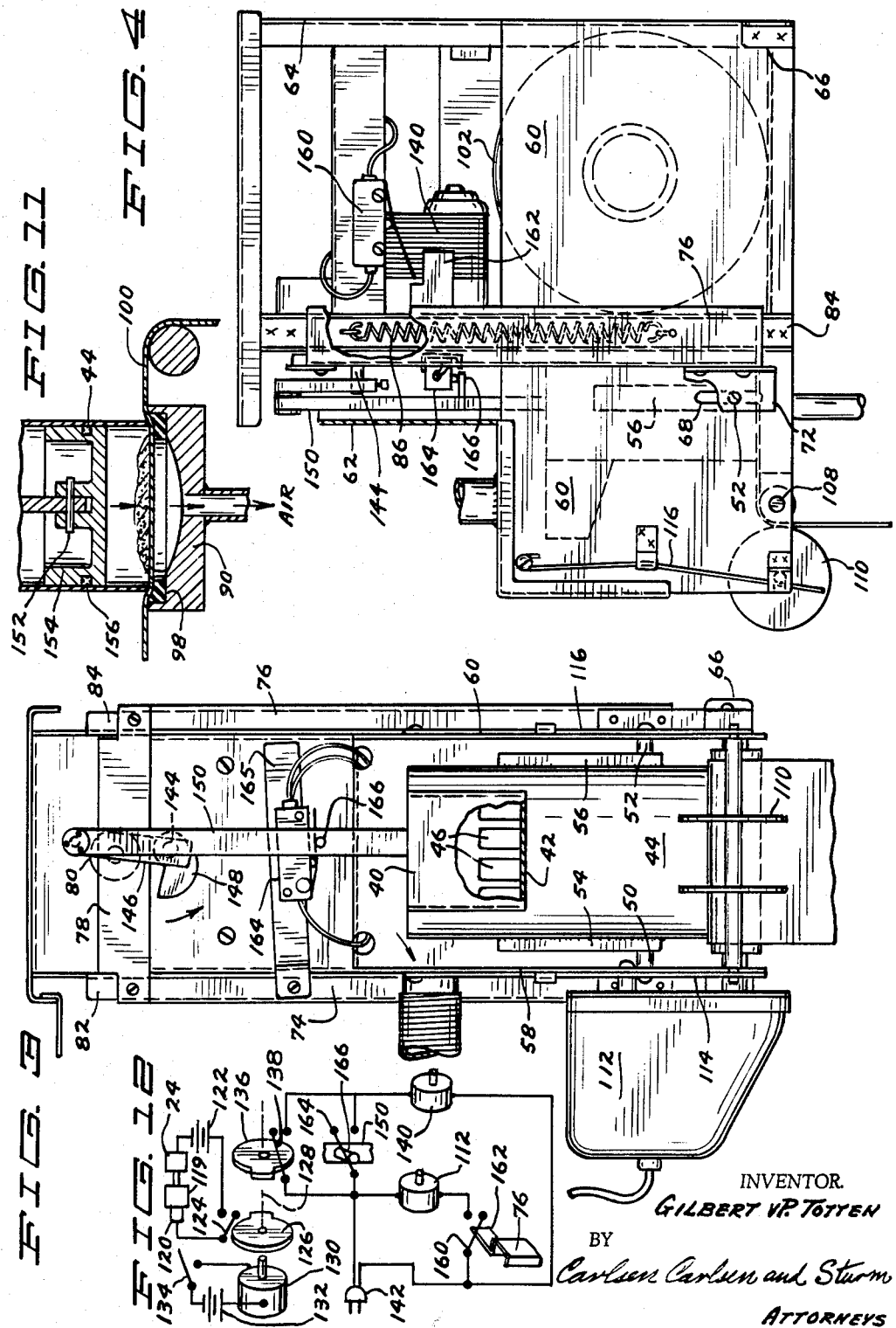

Aug. 31, 1965  G. VP. TOTTEN  3,203,340
BEVERAGE BREWING AND DISPENSING MECHANISM
Filed Feb. 1, 1963  3 Sheets-Sheet 3
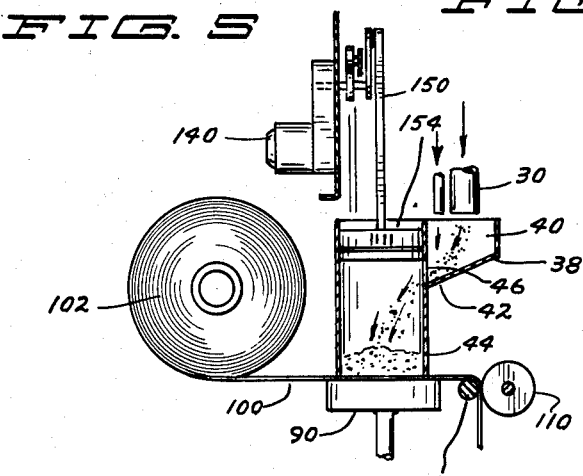
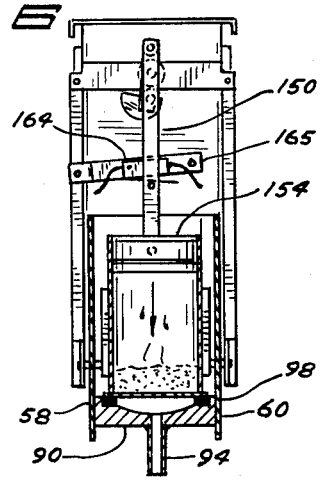
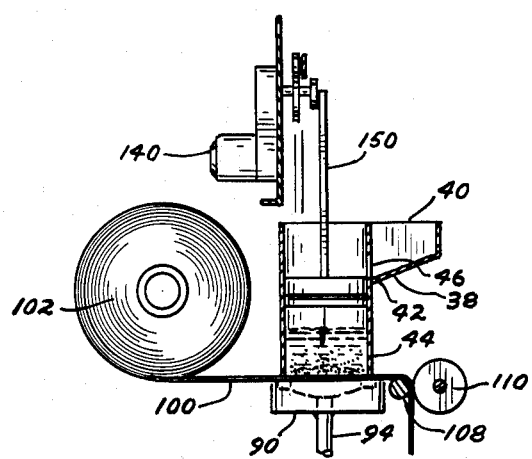
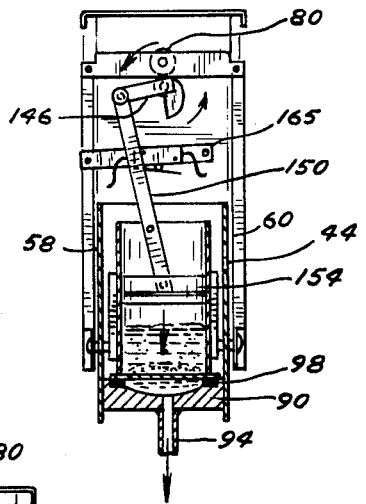
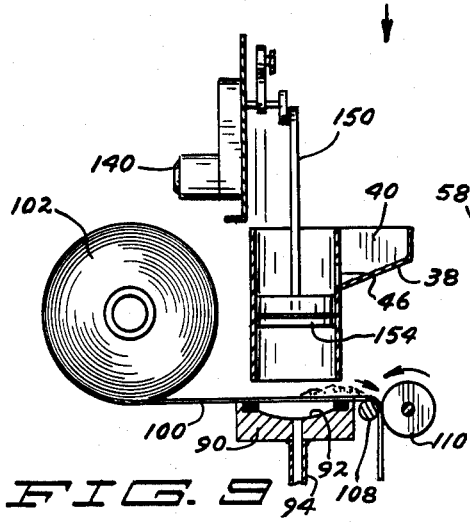
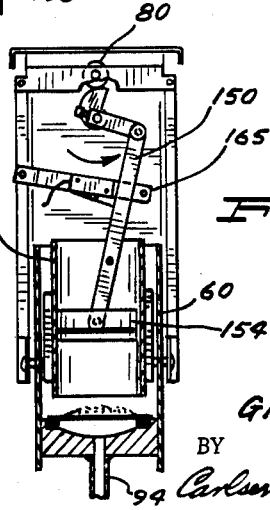
INVENTOR.
GILBERT VP. TOTTEN
BY
Carlsen, Carlsen and Sturm
ATTORNEYS

United States Patent Office 3,203,340
Patented Aug. 31, 1965

3,203,340
BEVERAGE BREWING AND DISPENSING
MECHANISM
Gilbert vP. Totten, % Advance Engr. Co., 2414 University
Ave. SE., Minneapolis 14, Minn.
Filed Feb. 1, 1963, Ser. No. 255,629
10 Claims. (Cl. 99—289)

The present invention relates to beverage brewing and dispensing devices and more particularly to devices for brewing and dispensing a plurality of successive batches of a beverage. The present invention has particular utility in automatic vending machines of the type in which a single cup of a beverage is brewed and dispersed when a coin is deposited in the machine.

A variety of devices have been previously proposed for brewing and dispensing beverages such as coffee or tea. Many of these devices include a provision for brewing a single cup at a time and for dispensing the beverage thus brewed at the end of the cycle. For various reasons these prior machines have not been entirely satisfactory. One important shortcoming of existing machines is that the filtering device used for separating the beverage solids from the beverage liquids tends to become clogged with small particles of beverage solids or grounds over an extended period of use. Obstruction of the filter element often takes place even though it is common to employ a complicated and consequently expensive device in the machine for cleaning the filter element between each cycle of operation. Another deficiency of many prior brewing and dispensing machines results from the fact that small particles of a finely divided solid will pass through the filtering element.

Many attempts have been made to remedy these difficulties. In some of the machines proposed to correct these problems, a portion of a strip of filter paper is held between a pair of cup-like enclosures with a charge of beverage solids resting upon the upper surface of filter paper between the cups. Boiling water is pumped through the chamber and over the grounds resting within the chamber. The liquids are then collected and dispensed. Thereafter the portions of the enclosure on either side of the filter paper separate and the filter paper is carried laterally to place an unused portion of the filter paper between the cup members.

These devices have also been found to suffer from several shortcomings, the most important of which is that the grounds resting on the filter paper after completion of the brewing cycle contain a relatively large amount of residual water. The grounds stored in the machine therefore must be emptied at relatively frequent intervals. More important, however, is the fact that the attendant who periodically services the machine is required, in most cases, to take the used filter paper, grounds and liquids to a suitable waste receptacle which is often located at a substantial distance from the vending machine. A further shortcoming of these machines derives from the complexity and added expense of two separate drive motors for moving the enclosures and for forcing the heated water through the filter.

In view of these and other shortcomings of the prior art, it is thus one general object of the present invention to provide an improved beverage brewing and dispensing mechanism which is rugged in construction, reliable in operation and can be manufactured at a relatively low cost.

It is a further object of the invention to provide an improved beverage brewing and dispensing mechanism including an elongate filtering medium and a means for intermittently advancing the filtering medium to place unused portions thereof in position for use.

It is yet another object of the present invention to provide an improved beverage brewing and dispensing mechanism including a provision for eliminating residual liquids from the filtering medium and the grounds deposited thereon whereby the storage and removal of waste materials from the machine is facilitated.

It is a further object of the present invention to provide an improved beverage brewing and dispensing mechanism including a filtering chamber having a pair of separable parts and a means for placing a filtering medium therebetween in which the same drive means functions both for forcing the beverage liquids through the filtering means as well as for moving said parts relative to one another.

These and other more detailed and specific objects will be disclosed in the course of the following specification, reference being had to the accompanying drawings, in which:

FIG. 1 is a partial front elevational view of a portion of an apparatus embodying the present invention.

FIG. 2 is a side elevational view partly in section of a brewing and dispensing mechanism of the present invention.

FIG. 3 is a front elevational view of the apparatus of FIG. 2.

FIG. 4 is an elevational view of the opposite side of the apparatus shown in FIG. 2.

FIG. 5 is a partial semi-diagrammatic illustration of the apparatus of the present invention during filling of the brewing chamber.

FIG. 6 is a transverse vertical sectional view of the apparatus of the present invention in the position of FIG. 5.

FIG. 7 is a partial semi-diagrammatic illustration of the present invention as it appears during the dispensing stage of the operating cycle.

FIG. 8 is a transverse vertical sectional view of the apparatus as it appears in the stage of operation shown in FIG. 7.

FIG. 9 is a partial semi-diagrammatic view of the apparatus of the present invention as it appears when the filter medium is transferred.

FIG. 10 is a transverse vertical sectional view of the apparatus of FIG. 9.

FIG. 11 is a partial vertical sectional view of the apparatus as it appears during the stage of operation in which the grounds and filter medium are being dried.

FIG. 12 is a schematic wiring diagram showing the electrical connections according to the present invention.

Referring now to the drawings which illustrate a preferred form of my invention. There is shown in FIG. 1 a vending machine indicated generally at 10. The vending machine 10 includes the usual sidewalls (not shown) and a rear wall 12. The vending machine 10 also includes a front wall (not shown) which will ordinarily be provided with the coin receiving mechanism of a suitable known construction.

Suitably mounted upon the rear wall 12 is a supporting shelf 14. Positioned upon the shelf 14 are a plurality of receptacles 16, 17 and 20 each containing beverage supplies such as cream, sugar and coffee. Specifically, according to the form of the invention herein illustrated, the receptacle 20 is constructed to contain ground beverage solids such as coffee grounds or tea leaves. A motor operated dispensing mechanism 22 of known construction is provided within the coffee storage receptacle 20 as can be seen in FIG. 1. While any suitable form of dispensing mechanism can be employed, I prefer to employ the mechanism similar to that described in my prior Patent No. 2,975,937, dated March 21, 1961.

The dispensing mechanism 22 is driven by an electric motor 24 as shown in FIG. 12. When the motor 24 is placed in operation, the dispensing mechanism 22 will allow a predetermined and measured quantity of ground coffee or the like to fall into a generally funnel-shaped conduit 26 and through a tubular member 28 into a duct 30. Similar funnel-shaped ducts 32 and 34 are used to convey materials stored in the receptacle 16 and 18, respectively, into an enclosure 36 to be described more fully hereinbelow. The operation or dispensing of material from the containers 16 and 18 will, of course, take place only when the dispensing mechanisms therein are suitably actuated. The devices used for performing these functions have not been illustrated since they form no part of the present invention.

The beverage solids passing through the conduit 28 and duct 30 fall as best seen in FIGS. 2 and 5 into a brewing chamber 38. The brewing chamber 38 preferably includes sidewalls 40 and an inclined bottom wall 42. As clearly shown in FIGS. 5, 7 and 9 the chamber 38 is mounted rigidly upon a filtering chamber 44 and communicates therewith through a plurality of openings 46 near the upper end of chamber 44. Since the lower wall 42 of the brewing chamber 38 is inclined downwardly toward the openings 46, the beverage solids will flow through the openings 46 into the filtering chamber 44 soon after they have been deposited in the brewing chamber 38 but sufficient time will elapse for much of the beverage solids to pass into solution.

The filtering chamber 44 comprises a cylindrical tube, open at both the upper and lower ends and supported at the side by means of a pair of coaxial pins 50 and 52 which project outwardly from vertically disposed brackets 54 and 56 respectively (FIGS. 3 and 4).

Positioned laterally of either side of the filtering chamber 44 are a pair of parallel plates 58, 60 which enclose the filtering chamber 44 on each side. The plates 58 and 60 are suitably secured rigidly together by means of suitable cross members such as a front plate 62 and a rear plate 64. The enclosure defined by the plates 58 and 60 is supported upon the back wall of the vending machine 10 by means of brackets 66 (FIGS. 2, 3 and 4). Steam and other undesirable excessive moisture can be removed from the area immediately adjacent the filtering chamber through a duct 61 communicating with the enclosure defined by the plates 58 and 60.

As best seen in FIG. 4, each of the pins 50 and 52 projects through a vertical slot 68 in each of the plates 58 and 60. The outward ends of the pins 50 and 52 are rigidly secured to brackets 70 and 72, respectively. Each of the brackets 70 and 72 is in turn connected to the lower end of a vertically disposed left and right channel member 74 and 76, respectively. Channel members 74 and 76 are connected together at their upper ends by means of a cross member 78 upon which is carried a wheel 80 for purposes hereinafter explained.

Each of the channels 74 and 76 is mounted with its open end facing inwardly and each is positioned over a similar but somewhat smaller but vertically disposed left and right channels 82 and 84, respectively. Channels 82 and 84 are themselves rigidly connected to the plates 58 and 60, respectively. A resilient member such as a spring 86 (FIG. 4) is connected at its upper end to the channel 76 and at its lower end to the channel 84 thereby forcing the channels 74 and 76 as well as the brewing chamber 44 downwardly.

The filtering chamber 44 includes a bottom portion or collecting member 90 which is rigidly supported between walls 58 and 60. The member 90 is provided with a central compartment 92 which communicates through duct 94 with the enclosure 36. Affixed to the upper end of the collecting member 90 is a circular resilient sealing member 98 which during operation will provide a seal between a sheet of a filter medium such as paper filter tape 100 and the lower end of the filtering chamber 44.

The tape 100 is stored in a roll 102 contained between the walls 58 and 60. The roll 102 can be replaced by opening a door 104 hingedly connected to the wall 58 at 106.

During the phase of operation in which the filtering chamber 44 is raised with regard to the collecting member 90, the tape 100 is advanced toward the right as seen in FIG. 9 by means of a pair of cooperating parallel rolls 108 and 110 each mounted for rotation between the plates 58 and 60. The roll 108 is connected to the shaft of a motor 112 and is driven thereby during operation of the motor in a clockwise direction, as seen in FIG. 2, so as to withdraw the strip of tape 100 toward the right in the drawings. The roll 110 is journaled in a pair of suitable slots in plates 58 and 60 and is held resiliently against the surfaces of paper contacting the roll 108 by means of a pair of laterally spaced apart springs 114 and 116 as best seen in FIGS. 2 and 4.

When the beverage solids or coffee grounds are admitted to the brewing chamber 38 through duct 30, a predetermined volume of heated water is also forced into the brewing chamber 38 through a duct 118 by a pump 119 driven by motor 120 and communicating with the outlet of a water heater 122 of any suitable known construction. The volume of water introduced into the filtering chamber 44 is adjusted such that the upper surface thereof will be substantially below the openings 46 for purposes hereinafter explained. Water can be supplied to the heater 22 through a duct 124 from a water supply line (not shown).

As can be seen in FIG. 12, the pump 119 and the motor 24 are both powered by a cell or other source of electricity 122 responsive to the closing of a switch 124. The switch 124 is operated in timed relationship to the movement of the filtering chamber 44 and dispensing plunger by means of a cam 126 affixed to a shaft 128. The shaft 128 is itself driven by a timing motor 130 which is connected in series with a cell 132 and a coin-operated vending switch 134.

Mounted upon the shaft 128 is a second cam 136 which is operatively connected to a switch 138. Thus, shortly after the switch 134 is closed by depositing a coin in the vending machine, the motor 130 will cause cam 126 to close switch 124 thereby dispensing water and beverage solids into the brewing chamber 38 through ducts 28 and 30 and duct 118. Shortly after the beverage solids and water is thus dispensed, the cam 136 will close switch 138 thereby causing current to pass momentarily through a cycle motor 140 which is wired in series with switch 138 and a source of current such as wall plug 142.

As best seen in FIGS. 2, 3 and 4 the motor 140 includes an output shaft 144 which is rigidly affixed to a crank arm 146 and a cam 148. Pivotally connected to the free end of the crank arm 146 is a connecting rod 150. The lower end of the rod 150, as best seen FIG. 11, is pivotally connected by means of a pin 152 to a plunger 154 which is mounted for sliding movement within filtering chamber 44. The plunger 154 is provided with a suitable sealing ring 156 to prevent the flow of fluid within the chamber 44 past the plunger 154. As shown in FIGS. 4 and 12, a switch 160 is connected between the motor 112 and the wall plug 142. A switch actuator 162 for opening and closing the switch 160 is mounted rigidly upon the channel member 76. As best seen in FIGS. 3 and 12, a normally closed cycling switch 164 is wired in parallel with the switch 138. The switch 164 is stationarily mounted upon a link 165 which is pivotally connected at one end to channel 74 and at the other end to the front plate 62 as best seen in FIG. 3. The switch 164 is opened by the upward movement of a pin 166 mounted rigidly upon the connecting rod 150 and positioned so as to contact switch 164 when the rod 150 has reached its approximate uppermost position.

Operation

When the machine is to be operated, a coin is inserted into a coin receiving mechanism (not shown) of any known construction which will function to close the switch 134. The closing of switch 134 will complete a circuit from the cell 132 through the motor 130 thereby driving the cams 126 and 136 as best shown in FIG. 12. The switch 124 will then close so as to complete a circuit through the water pump motor 120 and through the dispenser drive motor 24. When the pump 119 and the dispenser 24 are operated, the coffee grounds or other beverage solids will fall from the duct 30 and heated water will be dispensed through the duct 118 into the brewing chamber 38. As this occurs, the plunger 154 will be approximately top dead center as best seen in FIG. 5. The filtering chamber 44 will itself be at its lowermost position with the lower end thereof pressing downwardly on the upward surface of the section of the filter tape 100 between the collecting member 90 and the filtering chamber 44. The heated water and beverage solids will then flow through the openings 46 into the filtering chamber 44 and will remain in the filtering chamber undisturbed for a predetermined period of time as controlled by the amount of time required for the cam 136 to close the switch 138 after the closing of switch 124. As best seen in FIG. 5, an air space is established between the upper surface of the liquids within the filtering chamber 44 and the lower surface of the plunger 154.

When the cam 136 momentarily closes the switch 138, the circuit will be completed through the cycle motor 140. As soon as the motor 140 begins to turn, the crank arm 146 will also begin to turn thereby lowering the connecting rod 150 and pin 166. When the pin 166 is lowered, the normally opened switch 164 will close thereby allowing current to flow into the motor 140 even after the switch 138 has again opened. As the crank arm 146 continues to turn, the plunger 154 will continue to travel downwardly in the filtering chamber 44. As this takes place, the beverage liquids are forced through the filter tape 100 into the collecting member 90 and the grounds will be deposited on the upper surfaces of the section of filter tape 100 within the filtering chamber 44 as best seen in FIG. 7.

After all of the beverage liquids have been forced through the filter tape 100, there will remain a predetermined volume of air within the filtering chamber 44 and below the plunger 154. Thus, as the plunger continues to move downwardly, the entrapped air will be forced through the grounds and filter paper during the last portion of the downward stroke as clearly shown in FIG. 11. In this way, all but an insignificant amount of moisture will be removed from the filter tape and grounds and for this reason the grounds and filter tape can be much more easily stored and removed. In practice, it has been found that the machine serviceman can carry the used grounds and filter paper in a small bag and need not dispose of them in a waste receptacle or toilet. The invention thus reduces the time required to service the machine as well as reducing the space required for used grounds.

The beverage liquids forced into the collecting member 90 will pass upwardly through the tube 94 into the enclosure 36. Other materials, such as cream or sugar can be dispensed into the enclosure 36 when required. The coffee or other beverage which has passed into the enclosure 36 will flow out through a duct at the lower end thereof and into a cup or other container from which it can be consumed.

The motor 140 will continue to turn the crank arm 146 and connecting rod 140 thereby raising the plunger 154 within the chamber 44. As the plunger begins to rise in the filtering chamber 44, the cam 148 will begin to engage the wheel 80 thereby raising the cross member 78 and channel 76 against the downward pressure of the spring 86. The filtering chamber 44 will, of course, be elevated along with the channels 74 and 76. The upward movement of these parts will, as seen in FIGS. 4 and 12, raise the switch actuator 162 thereby closing the switch 160.

When the switch 160 has been closed, the motor 112 will begin to operate thereby driving the filter paper 100 toward the right as seen in FIG. 11 and in this way causing an unused portion of filter paper 100 to be positioned between the filtering chamber 44 and the beverage collecting member 90. As the crank arm 146 continues to turn and the plunger has reached a position approaching the top of the filtering chamber 44, the cam 148 will disengage the wheel 80 and the spring 86 will then draw channels 74, 76 and the filtering chamber 44 downwardly. As these parts begin to move downwardly, the switch actuator 162 will allow switch 160 to open thereby turning off the drive motor 112. The filtering chamber will continue to move downwardly until the lower edge thereof is held firmly in contact with the filter paper 100 by spring 86. The plunger 154 will continue to move upwardly within the filtering chamber 44 until the pin 166 has opened switch 164.

After the full cycle of operation has now been thus completed, the apparatus is in condition to be operated again in the same way as described hereinabove through an indefinite number of cycles as determined by the amount of beverage solids available in the storage receptacle 20.

It can thus be seen that my invention provides a very effective means for both brewing and dispensing a beverage and for reliably removing residual moisture from the filter paper and beverage solids deposited thereon. For this reason, the grounds and filter paper can be stored and disposed of more easily. The air space was also found to reliably prevent used grounds from becoming lodged on the lower surface of the plunger which could, of course, adversely affect the flavor and aroma of the beverage. The air forced through the filter also purges the collecting member and duct 94 thereby assuring that each cup of dispensed beverage is fresh. The dispensing of the beverage can be carried out quickly since the plunger in movement through the filtering chamber 44 is positive acting. It will also be seen that the construction of the device has been simplified through the use of a single drive motor 140 for operating the dispensing plunger 134 and also for separating the filtering chamber 44 from the collecting member 90.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A beverage brewing apparatus, comprising in combination, a brewing chamber, a filtering chamber, said filtering chamber having inlet means intermediate its ends and in fluid communication with said brewing chamber including means for introducing liquid and solid beverage brewing materials therein, said filtering chamber having first and second separable portions, drive means for providing relative axial motion between said portions, a filtering medium adapted to be positioned between the first and second portions of said filtering chamber, a drive means for advancing said filtering medium between said first and second portions when said first and second portions have been separated, a plunger slidably mounted within said first portion for operation between positions substantially above said inlet means and in proximity to said filtering medium, said plunger being adapted, upon downward movement to force a substantial quantity of air and said liquid through that part of said filter medium positioned between said first and second portions of said filtering chamber, and duct means communicating with said second portion of said filtering chamber for transporting said liquids away from said filtering chamber.

2. A beverage brewing apparatus, comprising in combination, a brewing chamber, a filtering chamber having an inlet opening therein disposed intermediate its ends and communicating with said brewing chamber, a collecting member mounted below said filtering chamber, said chamber being movable along a vertical axis relative to said collecting member, drive means for changing the relative spacing between said filtering chamber and said collecting member, a filter element, a portion of said filter element being positionable between said filtering chamber and said collecting member, a plunger mounted for reciprocation within said filtering chamber and operable between positions above and below the level of the inlet opening in said filtering chamber, means for filling said filtering chamber to a predetermined level substantially below the level of the inlet opening on said filtering chamber with beverage forming materials including a liquid and a solid portion, drive means operatively connected to said plunger for retracting said plunger upwardly within said filtering chamber to a level above said inlet opening to thereby establish a substantial air space within said filtering chamber above the level of said beverage brewing materials and for forcing said plunger downwardly to drive said liquid through said filtering element first and thereafter driving the air through said filtering element to thereby extract residual liquid from said solid portion of said beverage forming materials and from said filtering element.

3. A beverage brewing apparatus, comprising in combination, a brewing chamber, a filtering chamber having an inlet opening disposed intermediate its ends communicating with said brewing chamber; a collecting member mounted below said filtering chamber, said filtering chamber being movable along a vertical axis relative to said collecting member, drive means for changing the relative spacing between said filtering chamber and said collecting member, a filter element, a portion of said filter element being positionable between said filtering chamber and said collecting member, a plunger mounted for reciprocation within said filtering chamber between a level substantially above said inlet opening and a level in proximity to the bottom end of said filtering chamber, means for filling said filtering chamber to a predetermined level substantially below said inlet opening with beverage forming materials, drive means operatively connected to said plunger for retracting said plunger upwardly within said filtering chamber to said level above said inlet opening to thereby establish a substantial air space within said filtering chamber above said beverage brewing materials and for forcing said plunger downwardly to said level in proximity to the bottom end of said filtering chamber to drive at least a portion of said beverage brewing material through said filtering element and thereafter for driving the air through said filtering medium.

4. A beverage brewing apparatus, comprising in combination, a filtering chamber, said filtering chamber having an inlet opening disposed intermediate the top and bottom ends thereof, a collecting member mounted below said filtering chamber, said filtering chamber being movable along a vertical axis relative to said collecting member, drive means for changing the relative spacing between said filtering chamber and said collecting member, a plunger mounted for reciprocation within said filtering chamber, means for filling said filtering chamber to a predetermined level substantially below said inlet opening with beverage forming materials and a crank arm operatively connected to said drive means for reciprocating said plunger from a position above said inlet opening to a position in proximity to the bottom end of said filtering chamber.

5. A beverage brewing and dispensing apparatus comprising in combination an enclosure having an inlet opening disposed intermediate its top and bottom ends; a filter element suspended entirely across the bottom end of said enclosure; a collecting member positioned to receive the material from the bottom end of said enclosure through said filtering element; first filling means for introducing a predetermined volume of beverage liquids into said enclosure; a second filling means for introducing a predetermined volume of beverage solids into said enclosure whereby the level of beverage materials in said chamber enclosure has reached a predetermined height substantially below the level of said inlet opening whereby said enclosure contains a substantial volume of air above the surface of said liquid and solid materials within said enclosure; means connecting said first and second filling means to said inlet opening and a delivery means for forcing said volume of air downwardly within said enclosure against said liquid to force said liquids through said filter element so that the solids are deposited thereon and for continuing to force said volume of air through the solids deposited upon said filter element to thereby remove residual moisture therefrom.

6. A coffee brewing and dispensing mechanism, comprising in combination; a filtering chamber, said filtering chamber including a cylindrical enclosure having an inlet opening intermediate its top and bottom ends, a collecting element and a filtering medium disposed between said collecting element and said enclosure; means for sealing the filtering element into engagement with the adjacent bottom portion of said enclosure; a storage container for containing a supply of beverage solids; means for introducing a quantity of said beverage solids into the inlet opening on said enclosure; means for introducing a quantity of beverage liquids into the inlet opening on said enclosure to bring the surface of said liquid and solid mixture to a predetermined level substantially below the level of said inlet opening within said enclosure, said enclosure having an air space thereinabove the surface of said liquid and solid materials; and a plunger operable between positions above and substantially below said inlet opening and being communicatively associated with said air space for forcing the air in said enclosure downwardly against said solids and liquid mixture to thereby drive said liquid through said filtering medium and for thereafter driving said air downwardly through said beverage solids and filtering medium to thereby remove residual moisture therefrom.

7. In a beverage brewing and dispensing apparatus having a filtering chamber and a plunger slidably mounted therein for forcing beverage materials through a filter element positioned against one end of the filtering chamber; the improvement comprising, a drive motor, a crank arm operatively connected to said drive motor, a connecting rod extending between said crank arm and said plunger, a means for supporting said filtering chamber for sliding movement axially of the path of travel of the plunger and a member rigidly connected to the crank arm and operatively associated with the filtering chamber for moving the filtering chamber in a direction away from said filter element when the plunger is at the opposite end of said filtering chamber from said filter element whereby an unused portion of the filter element can be moved to a position adjacent the filtering chamber when the filtering chamber is moved away from said filter element.

8. A brewing apparatus for preparing a beverage from solid and liquid components, comprising in combination, a brewing chamber, a filtering chamber, a plunger slidably mounted within said filtering chamber, said filtering chamber having an inlet connected to said brewing chamber to receive the beverage from the brewing chamber when said plunger is at one end of said chamber, a receiver, a filtering tape positioned thereon, said filtering chamber being adapted to clamp said filtering tape against said receiver, said filtering tape being adapted to separate said solids from said liquid components when the plunger is moved in said filtering chamber toward said tape, a first drive for separating said chamber from said receiver and drive means for moving said tape to position a fresh portion of said tape between said receiver and said chamber when said chamber has been separated from said receiver.

9. A beverage brewing apparatus, comprising in combination; a filtering chamber having an inlet intermediate its ends and adapted to receive a predetermined quantity of beverage forming materials, said chamber being open at its lower extremity; a collecting chamber disposed below said filtering chamber; drive means operable to change the relative spacing intermediate said filtering chamber and said collecting chamber; a filtering medium, said medium being adapted to be positioned intermediate said filtering chamber and said collecting chamber; a plunger reciprocably mounted within said filtering chamber and adapted to be operated between positions substantially above the inlet in said filtering chamber and the level of beverage forming materials to be supplied to said filtering chamber and a position in proximity to the lower end of said filtering chamber whereby a substantial quantity of air is entrapped intermediate said plunger and the top of the beverage forming materials; and means operable to move said plunger intermediate said positions when said filtering chamber and said collecting chamber are in adjacent filtering disposition and said filtering chamber has been filled with a predetermined quantity of beverage forming materials to a level below said inlet whereby the substantial predetermined quantity of air intermediate said plunger and said beverage forming materials provides a compressible elastic cushion intermediate said beverage forming materials and said plunger and, after forcing the beverage forming materials through said filter medium, the air extracts the residual liquid from any material present on said filter medium.

10. In a beverage brewing and dispensing apparatus having a filtering chamber and a plunger slidably mounted therein for forcing beverage materials through a filter element positioned against one end of the filtering chamber; the improvement comprising, a drive motor, a crank arm operatively connected to said drive motor, a connecting rod extending between said crank arm and said plunger, a means for supporting said filtering chamber for sliding movement axially of the path of travel of the plunger and a member rigidly connected to the crank arm and operatively associated with the filtering chamber for moving the filtering chamber in a direction away from said filter element when the plunger is at the opposite end of said filtering chamber from said filter element whereby a clean portion of the filter element can be moved to a position adjacent the filtering chamber when the filtering chamber is moved away from said filter element.

References Cited by the Examiner

UNITED STATES PATENTS

| | | | |
|---|---|---|---|
| 1,390,008 | 9/21 | Arduino | 99—289 |
| 1,754,146 | 4/30 | Calvino | 99—302 |
| 2,529,395 | 11/50 | Hummel. | |
| 2,910,928 | 11/59 | Rota. | |
| 3,019,719 | 2/62 | Parraga | 99—287 |
| 3,095,800 | 7/63 | Gilbert | 99—289 |

FOREIGN PATENTS 501,811  11/54  Italy.

WALTER A. SCHEEL, *Primary Examiner.*

JOSEPH D. BEIN, ROBERT E. PULFREY, *Examiners.*